Oct. 30, 1962  J. W. ACKLEY  3,060,872
LIQUID FERTILIZER CONTROL MEANS
Original Filed June 6, 1956  3 Sheets-Sheet 2

*INVENTOR.*
JOHN W. ACKLEY
BY
Roger C. Johnson
ATTORNEY

Oct. 30, 1962 J. W. ACKLEY 3,060,872
LIQUID FERTILIZER CONTROL MEANS
Original Filed June 6, 1956 3 Sheets-Sheet 3

*INVENTOR.*
JOHN W. ACKLEY
BY
Roger C. Johnson
ATTORNEY

United States Patent Office 3,060,872
Patented Oct. 30, 1962

3,060,872
LIQUID FERTILIZER CONTROL MEANS
John W. Ackley, Moline, Ill., assignor, by mesne assignments, to Deere & Company, a corporation of Delaware
Original application July 6, 1956, Ser. No. 596,332, now Patent No. 3,003,775, dated Oct. 10, 1961. Divided and this application Aug. 12, 1960, Ser. No. 49,337
2 Claims. (Cl. 111—67)

This application is a division of my copending application, Ser. No. 596,332, filed July 6, 1956 for Liquid Fertilizer Attachment, now U.S. Patent 3,003,775, issued October 10, 1961.

The present invention relates generally to agricultural implements and more particularly to planting and fertilizing implements.

The object and general nature of the present invention is the provision of a planting and fertilizing implement particularly constructed and arranged to plant a plurality of rows and distribute liquid fertilizer in or along the rows at the same time that the planting is done, with the implements particularly constructed to provide for the mounting of the liquid fertilizer tanks substantially balanced or centered over the supporting ground wheels of the planter, whereby adequate and substantial quantities of liquid fertilizer may readily be carried without requiring an excessively heavy planter frame and without disturbing the normal balance and handling of the planter itself.

More specifically, it is a feature of this invention to provide a liquid fertilizer attachment especially constructed and arranged for connection to an existing planter without overloading the latter and without disturbing the normal balance and handling of the implement.

A further feature of this invention is a provision of a liquid fertilizer implement in which the liquid fertilizer is carried in a tank or tanks, the shape of which is such that most of the liquid in the tank is carried in the upper two-thirds of the tank, which results in a minimum variation of the liquid head throughout most of the delivery cycle. Thus, a more accurate and uniform delivery of the fertilizer is secured while keeping the profile of the planter relatively low.

Still further, an additional feature of this invention is the provision of a planter and liquid distributing implement in which the control of the liquid distribution is connected with the raising and lowering of the planting furrow openers, with additional means so constructed and arranged that the operator may open or close the liquid distributing valve means independently of the position of the planter furrow openers.

Another feature of this invention is the provision of a new and improved distributing valve arrangement in which siphoning of liquid from one tank to the other, when two tanks are used, is prevented, thereby facilitating filling the tanks.

These and other objects and advantages of the present invention will be apparent to those skilled in the art after a consideration of the following detailed description of the preferred structure and embodiment of this invention, taken in conjunction with the accompanying drawings, in which:

FIG. 9 is a detail view, partly in section, of the front tank support clamp.

FIG. 10 is a fragmentary view of certain of the valve-operating connections.

Figure 1:
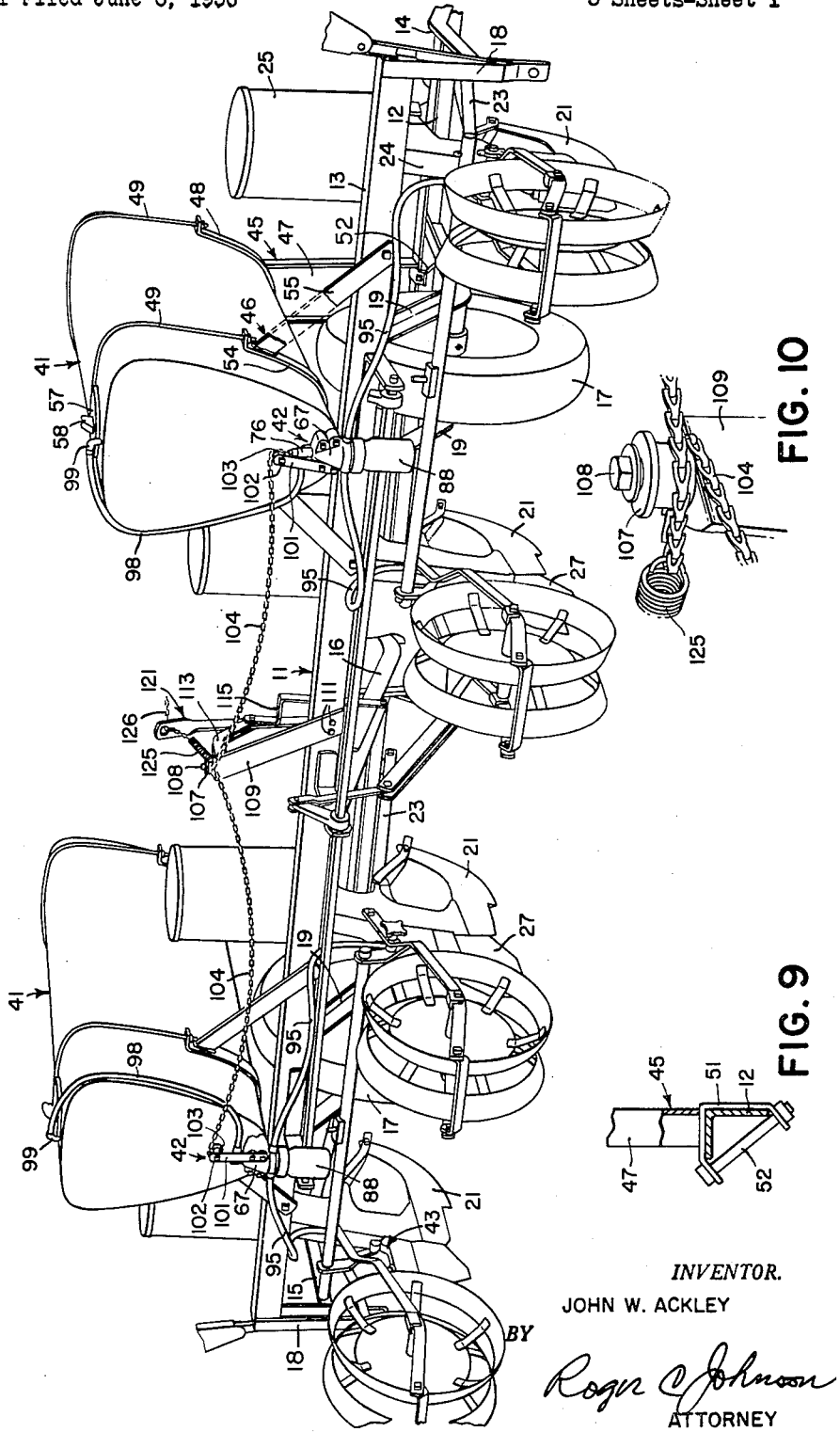
FIG. 1 is a perspective view of a planting and liquid distributing implement in which the principles of the present invention have been incorporated.

Referring first to FIG. 1, it will be seen that the present invention has been illustrated as incorporated in a four-row planting and liquid distributing implement in which, for purposes of illustration, the liquid distributing means, taken as a whole, is shown as an attachment to a four-row corn planter quite similar to that shown in U.S. Patent 2,376,464, issued May 22, 1945, to C. H. White, to which reference may be made if necessary.

Figure 8:
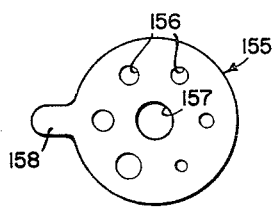
FIG. 8 is a detail view of one of the metering disks.

Briefly, the planter comprises frame means 11 that is made up of a front lower sill bar 12, extending transversely relative to the direction of travel, and a rear transverse sill bar 13 connected together at their ends by right and left hand crossbars 14 and 15, the rear end of each of the crossbars 14 and 15 being connected to the rear sill bar 13 through a vertical marker arm bracket 18 that is welded at its upper end to the adjacent end of the still bar 13. The sill bars 12 and 13 are also connected together by intermediate bars one of which can be seen at 16. The frame 11 is supported on two ground wheels 17 each being journaled for rotation on axle means carried by a wheel frame, each wheel frame being made up of a pair of laterally spaced apart wheel frame bars 19 between which the associated ground wheel 17 is disposed. The planter also includes a plurality of furrow openers 21 connected with the front sill bar 12 by upper and lower links 23 to the rear ends of which is connected a generally vertically disposed shank 24 that carries at its upper end a seed hopper 25 containing suitable seed selecting mechanism of conventional construction. Preferably, each pair of upper and lower links is connected with the front sill bar 12 through the associated bevel gear housing 26, generally similar to the link connection shown in the U.S. Patent 2,033,366, issued March 10, 1933, to C. H. White. In the planter shown in FIG. 1, four planting units are shown and each unit includes a rear fertilizer boot 27 having an opening into which normally a fertilizer tube is connected, usually in the manner indicated in FIG. 8 in U.S. Patent 2,369,508, issued February 13, 1945, to C. H. White. Generally, the connection between the fertilizer tube and the fertilizer boot is in the nature of a bayonet joint, including a pin or a pair of pins on the lower end of the fertilizer tube and an L-shaped slot, or a pair of such slots, formed on the inside of the fertilizer opening receiving the fertilizer tube. A joint of this kind is shown in the patent to Smith, 422,987, issued March 11, 1890. Detailed reference to the connection between the conventional fertilizer tube and the associated fertilizer boot of the furrow opener is made here for the reason that the particular construction of the metering head of the liquid dispensing mechanism of the present invention is especially adapted to cooperate with a fertilizer boot of the construction just described, so that when utilizing the liquid dispensing means of the present invention, no change need be made in the fertilizer boot on the planter runners or furrow openers.

This particular feature of my invention is disclosed and claimed in U.S. Patent 2,888,891, issued June 2, 1959.

The planter shown in FIG. 1 is also equipped with power lift mechanism substantially like that disclosed in the White Patent 2,376,464. Such mechanism includes a self-interrupting clutch unit 31 driven from the ground wheels and arranged, when actuated, to swing a lift lever 32 in a generally fore-and-aft direction, the part 32 being swung forwardly when it is desired to raise the furrow openers into a transparent position and rearwardly when it is desired to lower the furrow openers. To this end, the upper portion of the swingably mounted lever 32 is connected to four chains 33 that extend from the lever 32 rearwardly to the rear sill bar and then laterally outwardly over associated pulleys or sheaves and downwardly to their respective points of connection with the furrow openers. The planter frame 11 is provided with a forwardly extending hitch that is generally similar to the hitch shown in the above-mentioned White Patent 2,376,464. The hitch is adapted to be connected to the conventional farm tractor, and the clutch unit 31 is controlled by usual clutch lever 36 and a cable connection 37 or the like that leads forwardly to the operator's station on the tractor. The clutch unit 31 is mounted on one of the crossbars 16 of the frame and also on a supporting angle member 16a, which also serves as a crossbar for the frame, that is connected at its front and rear ends to the front and rear frame sill bars 12 and 13.

According to the principles of the present invention, liquid dispensing mechanism is associated with the planter and, in general, comprises a pair of liquid fertilizer containing tanks 41 and suitable controlling valve means 42 and adjustable metering units 43. There is a liquid distributing valve unit 42 for each tank 41 and a metering unit 43 for each of the planter furrow opener units 21.

Each of the tanks 41 is supported by a front bracket structure 45, carried by the front sill bar 12 of the planter, and a rear bracket structure 46 carried by the rear sill bar 12 of the planter, and a rear bracket structure 46 carried by the rear sill bar 13. According to the present invention, each tank 41 is supported by the planter frame directly over the associated ground wheel 17 and substantially axially centered, both laterally and in a fore-and-aft direction, over the associated wheel. The front bracket structure 45 comprises a generally vertically disposed channel member 47 having at its upper end a generally U-shaped cradle strap 48, the upper ends of which are turned laterally outwardly and apertured to receive a tank-securing U-bolt 49.

As will best be seen from FIG. 1, each tank 41 is generally elongated and of substantially pear-shaped configuration, being relatively narrow in the lower portion and widening upwardly, the depth of the tank being considerably greater than the transverse width at the widest point. The cradle strap 48 is, of course, of corresponding configuration. The lower end of each bracket channel 47 is fixed to the associated planter sill bar 12 by a pair of mounting clamps 51 especially constructed to engage over the sill bar 12, which is in the form of an angle, and clamped rigidly to the latter by clamping bolt means 52, as shown in FIG. 9.

The rear mounting bracket 46 for the tanks 41 comprises a cradle strap 54 and a pair of brace links 55 extending downwardly and laterally outwardly from the upper portion of the cradle strap 54. The upper ends of the latter are turned outwardly and apertured to receive a second tank-securing U-bolt 49 for the rear portion of the associated tank 41.

Access to the interior of each tank is provided by means of a closure cover 57 in the form of a round disk and associated clamping means 58 that secures the disk to the tank in sealed relation. As will best be seen from FIG. 1, the front brackets 45 are longer than the rear brackets 46 so as to accommodate the higher position of the rear sill bar 13. The front brackets 45 are of substantial width and serve to prevent any lateral displacement of the front ends of the associated tank. Lateral displacement of the rear end of the tank is prevented by the downwardly and outwardly diverging cradle legs 55. The rear end of each tank is adapted to receive an associated distributing valve structure 42 as mentioned briefly above, and these valve structures will now be described.

Figure 3:
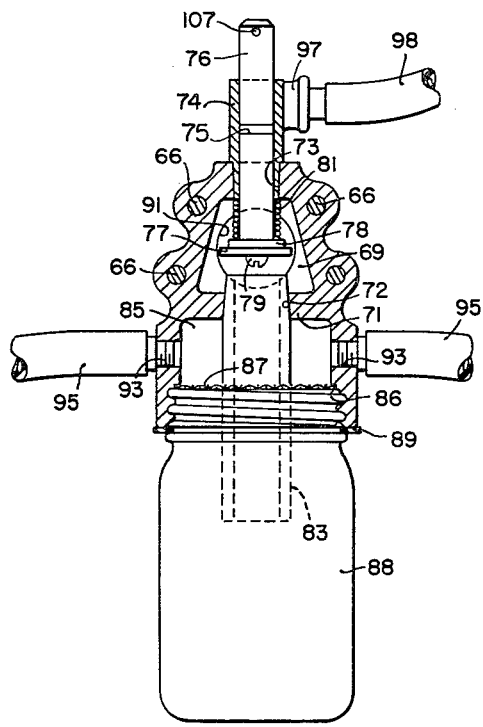
FIG. 3 is a sectional view taken generally centrally through the distributing valve unit.
Figure 4:
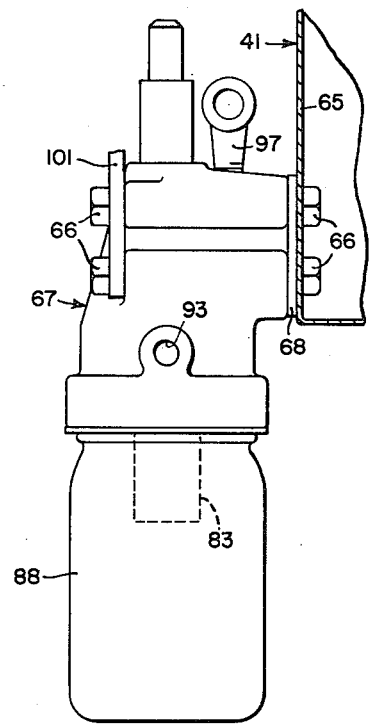
FIG. 4 is a side view of the distributing valve unit showing its relation to the tank and also a portion of the valve opening means.
Figure 5:
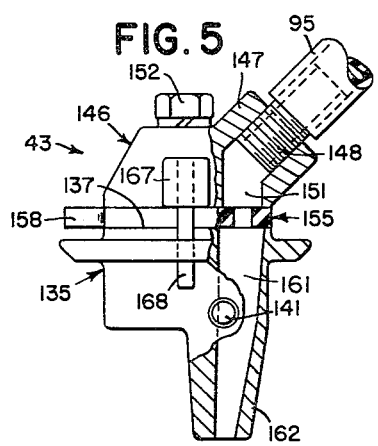
FIG. 5 is a sectional view taken through one of the metering heads that is connected with the distributing valve unit and is carried by the associated furrow opener of the planter.

Referring now to FIGS. 1 and 4, each tank 41 is arranged so that its rear end extends rearwardly a substantial distance beyond the associated rear sill bar 13. The rear end plate of the tank, indicated at 65, is provided with four apertures to receive bolt means 66 by which a distributor valve body, preferably in the form of a casting 67, is fixed to the associated tank 41 with an intervening resilient gasket 68 sealing the connection between the valve body and the tank. The valve body is provided at its upper portion with a chamber 69 disposed above a generally central partition 71, which is provided with a through opening 72, and the upper portion of the valve body is provided with an upper opening 73. Disposed in the upper opening 73 is a valve stem guide 74, preferably in the form of a short tube of plastic or other corrosion resistant material, the lower end of which is threaded into the upper opening 73. A valve stem 76 is disposed for generally vertical movement therein, extending at its upper end from the upper end of the pipe or guide 74. Centrally the valve stem 76 is provided with a groove 75 in which an O-ring or other sealing means is disposed. The lower end of the valve stem extends into the chamber 69 and carries a valve closure 77 connected to the lower flanged end 78 of the valve stem 76 by means of a screw 79 or the like. A spring 81 is disposed between the flanged lower end 78 of the valve stem and the upper wall of the chamber 69 whereby the valve is biased for movement toward its closed position. The lower partition wall 71 carries an inlet tube 83, the upper end of which is tapered and threaded into the opening 72, and the upper end of the inner tube is disposed above the partition wall 71 and serves as a valve seat to receive the closure 77. The lower portion of the inlet tube extends downwardly and outwardly of the distributor valve body casting 67 and through a discharge chamber 85 that is formed therein above the lower portion of the member 67. The latter is formed with a downwardly facing shoulder 86 against which a screen 87 of stainless steel is disposed, the screen 87 having an opening through which the lower portion of the inlet tube 83 extends. Below the shoulder 86 the casting 67 is provided with screw threads shaped to receive the upper portion of a commercially available Mason jar that surrounds the lower end of the inlet tub 83. The jar when tightened against a sealing ring 88 serves to hold the screen 87 in position. Liquid enters the upper chamber 81 through an opening 91 which registers with a similar opening in the rear tank end 65 and, if the valve 77 is open, as shown in FIG. 3, the liquid passes downwardly through the inlet tube into the jar 88, upwardly through the screen 87, and then outwardly through a pair of openings 93 in the lower portion of the distributor valve body 67, the openings 93 receiving nipples or the like to which delivery tubes 95 are connected. Preferably, the delivery tubes 95 are of transparent plastic material of any suitable composition and permit the operator to ascertain visually whether or not liquid is flowing through the tubes 95.

In order to afford the operator an opportunity to check the liquid level in the tank, the upper portion of the valve body 67 is provided with a threaded opening into which a nipple 97 is received. A transparent tube 98, also preferably of plastic or the like, is connected at its lower end to the nipple 97 and extends around the side of the tank and upwardly to a nipple 99 by which the upper portion of the tube 98 is connected into the space in the upper portion of the tank 41. The nipple 97 communicates with the chamber 69.

In order to provide means to open and close the valve 77, a bracket 101 is carried by the casing 67, being fixed to the latter by two of the bolts 66. The upper end of the bracket 101 is apertured to receive a bolt 102 on which a roller 103 is mounted. A flexible element in the form of a chain 104 is trained over the roller 103 and extends downwardly to the valve stem 76, being connected to the latter by a pin 107 or other suitable fastening means. Thus, a pull on the chain 104 serves to lift the valve 77 against the bias of the spring 81 and thus open communication between the tank and the auxiliary tubes 95 through the associated sediment chamber 88 and screen 87. When tension on the cable 104 is released, the spring 81 closes the valve and shuts off the delivery of liquid through the associated delivery tubes 95. Each delivery tube discharges into or through a metering unit 43 on the associated furrow opener unit. The metering units will be described later.

Figure 2:
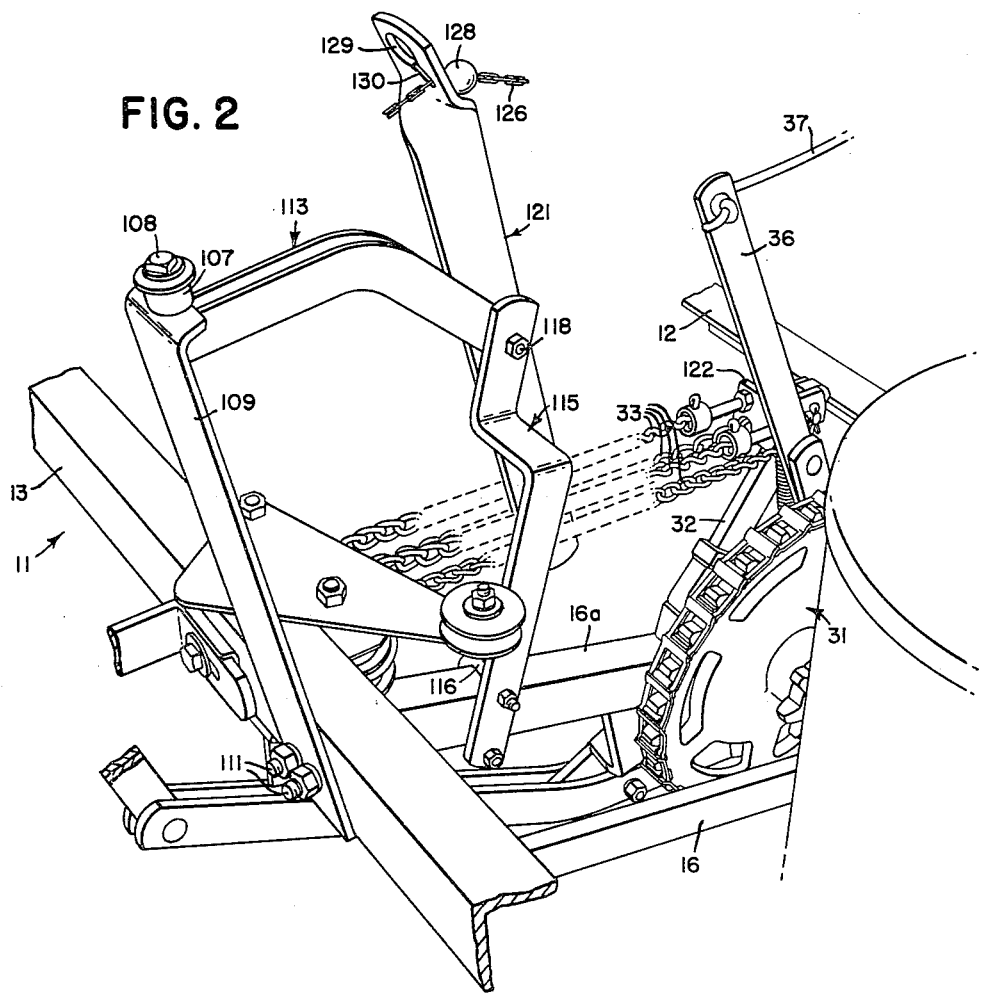
FIG. 2 is a fragmentary perspective showing at an enlarged scale one portion of the valve operating means.
Figure 7:
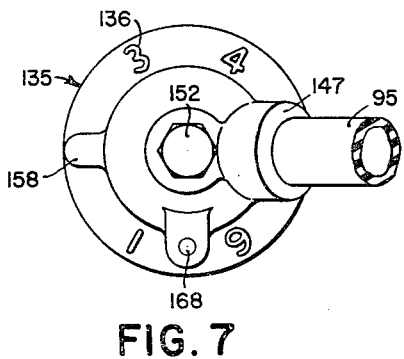
FIG. 7 is a top view of the metering head.

The chains 104 from the two tanks 41 extend laterally inwardly from the associated rollers 103 and are disposed around a guide 107, which may be a roller like the roller 103, mounted by means of a bolt 108 on the upper end of a center post 109, preferably in the form of a plate member secured to the rear sill angle 13 by a pair of bolts 111 at its lower end, the upper end being bent forwardly into a horizontal plane and apertured to receive the bolt 108. The latter also secures the rear or bight portion of a valve control arm guide member 113 to the post or bracket 109. The front end of the control arm guide member is connected to and supported on the upper end of the support bar 115, the lower end of which is connected by U-bolt 116 rigidly to the frame angle 16a. The upper end of the supporting bar 115 is offset laterally so as to bring the upper end in the plane of the guide member 113 and is apertured to receive a bolt 118 which secures the member 113 and bar 115 together and also serves as means on which a valve control arm 121 is mounted for rocking movement. The lower end of the arm 121 is disposed between the laterally spaced apart pairs of chains 33 in a position to be engaged by a connecting member 122 by which the chains 33 are connected with the upper end of the power lift actuated lever 32. The parts are arranged so that when the furrow openers are lowered by the rear swinging of the upper end of the lever 32, the connector 122 engages the lower end of the valve control arm 121 and swings the upper end of the latter forwardly. This movement of the arm 121 actuates the chains 104 by virtue of their forward connection through a spring 125 with a manually controlled tension member, such as a chain or cable 126, that extends forwardly to the operator's station on the tractor. The element 126 is connected with the control arm 121 through an abutment 128 on the chain and which is adapted to be disposed in a keyhole opening 129 at the upper end of the control arm 121, the chain 126 lying in the slot 130 of the opening 129 with the abutment 128 forward of the control arm. When the valve control arm 121 is swung rearwardly, as in the position shown in FIG. 2, tension on the chains 104 is relaxed and the valves in the distributing units 42 are closed. At any time the operator desires to do so, he may pull forwardly on the cable 126, and thus open the valves 77 manually. On the other hand, if he should desire the valve to remain closed even though the furrow openers are lowered, the operator may pull slightly on the chain or cable 126 (FIG. 1), sufficient to move the abutment 128 forwardly, and then by lifting up slightly on the cable 126, the abutment may be brought in front of the large portion of the opening 129, whereupon relaxing the tension in the cable 126 permits the spring 125 to draw the abutment 128 entirely through the opening in the upper end of the control arm 121. When this occurs forward movement of the lever 121 does not exert any pull through the rear portion of the cable 126 against the valve-opening cables or chains 104.

The metering units 43 will now be described.

Figure 6:
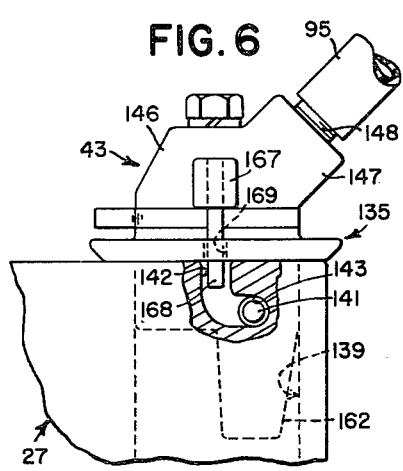
FIG. 6 is a side view of the metering head, showing the manner in which the metering head fits and is secured in the opening of the planter runner into which a conventional fertilizer tube ordinarily is connected.

As mentioned above, there is a metering unit 43 fixed to the rear portion of the fertilizer boot on each planter furrow opener. Each of the metering units 43 includes a base member 135 having an upper head section 136 carrying indicia in the form of the numbers 1 through 6 around the peripherial portion thereof and a relatively flat generally central section 137. The main portion of the base 135 is adapted to extend downwardly into the fertilizer tube receiving opening 139 of the fertilizer boot 27, as shown in FIG. 6. A lug or projection 141 is formed on the outer side of a portion of the base member 135, and each of these lugs, there being a lug 141 at each side of the member 135, is adapted to enter the associated bayonet connection slot entrance 142, and then after the member 135 has been turned to carry the lugs 141 into the socket portions 143 of the associated bayonet slots, the base member 135 is secured to the associated fertilizer boot. The upper member of the metering unit 43 includes a cap member 146 which is formed with an inlet extension 147 tapped to receive a nipple 148 to which the lower end of the associated delivery tube 95 is connected. The inlet extension 147 communicates with an interior chamber 151 disposed at one side of the cap member, the latter and the base member 135 being centrally apertured to receive a connecting stud 152 by which the parts of the metering unit are adapted to be connected tightly together.

Disposed between the cap member and the base member is a metering gasket 155 which is formed as a flat disk-like part having a plurality of openings 156 of different sizes disposed about the central opening 157 through which the connecting bolt 152 extends. An index tab 158 extends outwardly from a portion of the metering disk 155 and cooperates with the indicia numbers on the flange 136 of the base to provide an indication as to which of the plurality of openings 156 that lies between the cap chamber 151 and the assoicated opening 161 in the base member 135, which fits into the associated fertilizer tube opening in the planter runner, the base 135 having a nozzle-like section 162 through which liquid is discharged into the furrow. Thus by loosening the bolt 152 and turning the orifice disk 155 into different positions, openings of different sizes may be brought into cooperative relation between the inlet extension 147 and the nozzle section or outlet 162 of the base member 135, all for the purpose of controlling the rate of delivery when the associated valve means is open.

The cap member 146 is provided with an extension 167 that carries a depending pin 168. This pin extends downwardly through an opening 169 in the flange 136 of the base member 135. One purpose of this arrangement is to maintain the openings in the cap member and base member in proper registry, and another purpose of this pin is to extend downwardly into the entrance opening 142 of the bayonet slot in the fertilizer boot, as shown in FIG. 6, so that the base member 135 is thus locked against accidental turning or other displacement relative to the fertilizer boot. It can be seen from FIG. 6 that if the lugs 141 are retained in the slot sockets 143, the base member 135 is locked to the associated fertilizer boot.

The operation of the present invention is believed to be obvious from the above description. The distributor valves are opened and closed in accordance with the lowering and raising, respectively, of the planter furrow openers in almost all normal operations. That is to say, when the runners or furrow openers are lowered to form furrows, the distributing valve mechanism is operated to automatically distribute liquid fertilizer into the furrows. If, however, it should be desired to raise and lower the furrow openers without operating the distributing valve means, the operator may disengage the abutment 128 from in front of the control arm 121 and bring it to the rear side thereof, as described above, whereby movement of the arm 121 will not open the distributor valve.

The rate of flow may be adjusted by removing the bolt or stud 152, taking the cap members 146 off the associated base members, turning the orifice disk 155 to the desired position, and then replacing the cap member 146 and tightening the same in a new position of the orifice disk 155.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A planting and liquid distributing implement comprising frame means, a plurality of planting units carried thereby, each including a ground penetrating furrow opener, a tank carried by said frame means, valve means controlling the discharge of liquid from said tank, and liquid conduit means extending from said valve means to each of said furrow openers, means on said frame means to raise and lower said furrow openers, and valve-operating means connected with said raising and lowering means and said valve means for closing the latter when the furrow openers are raised, said valve-operating means including a forwardly movable part having a keyhole slot, a chain extending through said slot and connected to operate said valve means, and an abutment on said chain adapted to be positioned so as to be engaged by said part when the latter moves forwardly for opening said valve means when said part is moved forwardly, and spring means acting against said valve means for closing the latter, said abutment being movable through the large portion of said keyhole slot to provide for closing said valve means independently of the forward movement of said part.

2. A planting and liquid distributing implement comprising frame means, a plurality of planting units carried thereby, each including a furrow opener, a pair of tanks carried by said frame means in laterally spaced apart relation, a distributing valve unit carried by each tank, each valve unit including a generally upwardly movable valve for controlling the flow of liquid from the associated tank, conduit means leading from each distributing valve unit to the associated furrow openers, raising and lowering means on said frame means for raising and lowering said furrow openers, said raising and lowering means including a forwardly movable part having an opening therein, an upwardly extending post carried by the generally central portion of said frame means, a pair of flexible elements, one connected with each of said valves to open the latter when the furrow openers are lowered, the inner ends of said flexible elements being carried by said post, a spring connected to the inner ends of said flexible element, a forwardly extending flexible element passed through the opening of said movable part and connected at its rear end with the forward portion of said spring, and an abutment on said last mentioned flexible element and disposable optionally in front of or in rear of said forwardly movable part.

References Cited in the file of this patent

UNITED STATES PATENTS

| | | |
|---|---|---|
| 2,802,435 | Maxwell | Aug. 13, 1957 |
| 2,859,718 | Barkley | Nov. 11, 1958 |
| 2,890,666 | Schnell | June 16, 1959 |
| 2,890,667 | Loomans | June 16, 1959 |